United States Patent [19]
Lin et al.

[11] Patent Number: 5,631,081
[45] Date of Patent: May 20, 1997

[54] PROCESS FOR BONDING LUBRICANTS TO A THIN FILM STORAGE MEDIA

[75] Inventors: Li-Ju J. Lin, San Jose; John S. Foster, Morgan Hill; Christopher S. Gudeman, Los Gatos; Gerard H. Vurens, Berkeley, all of Calif.

[73] Assignee: International Business Machines Corporation, Armonk, N.Y.

[21] Appl. No.: 341,856

[22] Filed: Nov. 18, 1994

Related U.S. Application Data

[63] Continuation of Ser. No. 681,272, Apr. 8, 1991, abandoned.

[51] Int. Cl.$^6$ ............................... G11B 5/66; B05D 5/12
[52] U.S. Cl. .......... 428/332; 428/336; 428/421; 428/694 T; 428/694 TP; 428/694 TC; 428/694 TF; 428/695; 428/900; 427/127; 427/128; 427/130; 427/131; 156/272.2
[58] Field of Search ................ 428/421, 694 T, 428/694 TP, 694 TC, 694 TF, 900, 332, 336, 695; 427/127, 128, 130, 131; 156/272.2

[56] References Cited

U.S. PATENT DOCUMENTS

| | | | |
|---|---|---|---|
| 4,503,125 | 3/1985 | Nelson et al. | 428/408 |
| 4,552,820 | 11/1985 | Lin et al. | 428/611 |
| 4,610,911 | 9/1986 | Opfer et al. | 428/213 |
| 4,713,287 | 12/1987 | Nishikawa et al. | 428/336 |
| 4,758,471 | 7/1988 | Arioka et al. | 428/336 |
| 4,778,582 | 10/1988 | Howard | 204/192.15 |
| 4,824,724 | 4/1989 | Ueda et al. | 428/336 |
| 4,828,899 | 5/1989 | Avioke et al. | 428/143 |
| 4,835,032 | 5/1989 | Avioke et al. | 428/143 |
| 5,071,715 | 12/1991 | Shoji et al. | 428/694 BP |

*Primary Examiner*—Leszek Kiliman
*Attorney, Agent, or Firm*—Blaney Harper; James C. Wilson; Noreen A. Krall

[57] ABSTRACT

The present invention is a method for bonding a lubricant onto the surface of rotating storage media. In particular, the method bonds reactive and non-reactive lubricants onto the carbon based protective coating of a magnetic storage disk. The lubricant is first applied onto the disk surface through conventional coating techniques, such as dipping, spinning, spraying, or vapor deposition. The thickness of the applied coating is thicker than the final bonded thickness of the lubricant. Typically, the applied thickness of the film is approximately 30 Angstroms. The lubricant coated disk surface is then exposed to low energy electron irradiation. The energy level of the accelerated electrons is below 100 eV. The lubricated film is exposed to a dosage level of approximately 1000 microcoulombs per square centimeter. This dosage level bonds approximately 15 Angstroms of lubricant to the disk surface. The non-bonded or excess lubricant is then rinsed off in a liquid freon or other suitable rinse.

6 Claims, 5 Drawing Sheets

STRUCTURE OF LUBRICANTS

| LUBRICANT | FORMULA |
|---|---|
| Fomblin Z-25 | $CF_3O-(CF_2CF_2O)_n-(CF_2O)_m-CF_3$ |
| Fomblin Z-15 | " |
| Fomblin Z-03 | " |
| Fomblin Z-DOL | $HOCH_2CF_2O-(CF_2CF_2O)_n-(CF_2O)_m-CF_2CH_2OH$ |
| Fomblin AM2001 | Piperonyl$-OCH_2CF_2O-(CF_2CF_2O)_n-(CF_2O)_m-CF_2CH_2O-$piperonyl[1] |
| Fomblin Z-DISOC | $OCN-C_6H_3(CH_3)-NHCO-CF_2O-(CF_2CF_2O)_n-(CF_2O)_m-CF_2-CONH-C_6H_3(CH_3)-NCO$ |
| Fomblin YR | $F(CFCF_2O)_n-(CF_2O)_m-CF_2CF_3$<br>$\quad\quad\vert$<br>$\quad\;\,CF_3$ |
| Demnum | $F(CF_2CF_2CF_2O)_n-CF_2CF_3$ |
| Krytox | $F(CFCF_2O)_n-CF_2CF_3$<br>$\quad\quad\vert$<br>$\quad\;\,CF_3$ |

1. 3,4 – methylenedioxybenzyl

FIG. 5

PROCESS FOR BONDING LUBRICANTS TO A THIN FILM STORAGE MEDIA

This application is a continuation of application Ser. No. 07/681,272, filed Apr. 8, 1991, now abandoned.

FIELD OF THE INVENTION

This invention relates to the manufacture of a thin film metal alloy or metal oxide magnetic recording disk. In particular, this invention relates to a process for manufacturing the recording disk. More specifically, this invention relates to a process of bonding a lubricant to the surface of the recording disk.

BACKGROUND OF THE INVENTION

Thin film magnetic recording disks typically comprise a substrate, such as an aluminum-magnesium (AlMg) alloy with a nickel-phosphorous (NiP) surface coating. The NiP is covered with a magnetic film, typically either a cobalt based metal alloy or a gamma phase iron oxide film. The magnetic film can be covered with a protective overcoat such as a sputter deposited amorphous carbon or a hydrogenated carbon film. A general description of the structure of such thin film disks is illustrated in U.S. Pat. No. 4,610,911 to Opfer, et al., and U.S. Pat. No. 4,552,820 to Lin, et al. A thin film disk having an amorphous carbon film as an overcoat is illustrated in U.S. Pat. No. 4,503,125 to Nelson, et al., and a thin film disk having a hydrogenated carbon film as an overcoat is described in U.S. Pat. No. 4,778,582 to Howard.

Data is recorded onto a magnetic disk having the structure described above by a read/write head. The read/write head is placed close to the surface of the magnetic disk which rotates at a high rate of speed. When the disk is rotating at a high rate of speed, the read/write head is lifted off the disk by air pressure from the rotating disk. When the disk is starting, stopping, or not rotating fast enough, the read/write head slides along the disk surface. A liquid lubricant, such as a fluoroether lubricant, is added to the surface of the carbon based protective overcoat to prevent damage to the magnetic disk, when the read/write head slides on the disk. Alternatively, the lubricant could be placed directly on the magnetic film without the use of an overcoat. The magnetic film may or may not have undergone any post processing after deposition. The lubricant prevents damage to the disk by reducing the friction between the read/write head and the disk.

Liquid lubrication of the disk surface has at least two problems which limit its effectiveness as used in rotating storage media. First, the lubricant does not have a retention means so that when the disk rotates, the lubricant spins off the disk. The depletion of the lubricant thickness from the disk surface increases the friction between the disk and the read/write head. Second, the depletion of the thickness of the lubricant is not uniform across the surface of the disk. Where the thickness is too thin, the head can cause wear on the disk surface. Where the lubricant thickness is too great, the head will become stuck in the lubricant (from static friction) and the head or disk could be damaged when the head suddenly becomes unstuck due to the rotating disk. Other failure modes include the inability of the spindle motor to start at all due to the static friction and failure of the mechanical suspension assembly. These effects are present even though the depletion is radial in nature.

One way in which to bond the lubricant to the disk and therefore prevent the depletion has been to thermally bond the lubricant to the disk surface. This technique increases the exposure of the magnetic media to corrosion and degrades the reliability of the disk. Another technique is to use a process having high energy electron beams. The lubricant is exposed to electron beams having an energy above ten KeV. This process has been shown to produce a modified lubricant film bonded to the disk surface. However, the modified film does not contain all the required lubricating properties of the unmodified film.

It is the object of this invention to bond a lubricating film onto the surface of a thin film storage media without encountering the prior art limitations. In particular the bonding process must bond a thick enough and uniform enough film to the storage media to prevent wear while avoiding problems associated with static friction. In addition the process must not degrade the chemical stability of the film bonded to the surface to minimize storage media corrosion. Finally, the process must bond a variety of lubricants to the storage media. The lubricants bonded must not be limited to polymers having a reactive end group.

SUMMARY OF THE INVENTION

The present invention is a method for bonding a lubricant onto the surface of rotating storage media. In particular, the method bonds reactive and non-reactive lubricants onto the carbon based protective coating of a magnetic storage disk. The lubricant is first applied onto the disk surface through conventional coating techniques, such as dipping, spinning, spraying, or vapor deposition. The thickness of the applied coating is thicker than the final bonded thickness of the lubricant. Typically, the applied thickness of the film is approximately 300 Angstroms. The lubricant coated disk surface is then exposed to low energy electron irradiation. The energy level of the accelerated electrons is below 100 eV. The lubricated film is exposed to a dosage level of approximately 1000 microcoulombs per square centimeter. This dosage level bonds approximately 150 Angstroms of lubricant to the disk surface. The non-bonded or excess lubricant is then rinsed off in a liquid freon or other suitable rinse.

BRIEF DESCRIPTION OF THE DRAWING

FIG. 5 illustrates the chemical structure of some of the lubricants in the present invention.

PREFERRED EMBODIMENT

Figure 1:
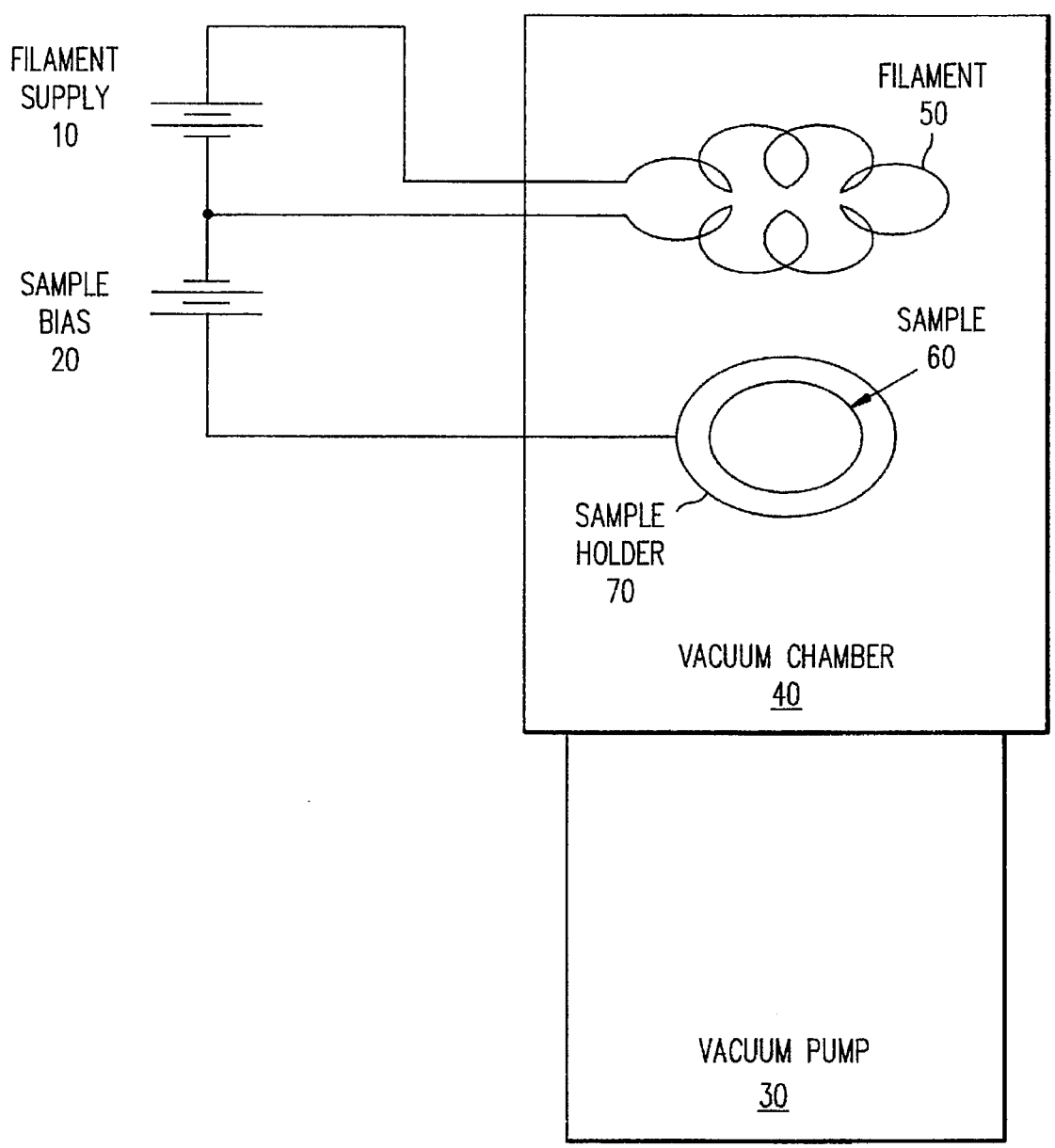
FIG. 1 illustrates an apparatus on which the present invention is performed.

The apparatus for carrying out the process of the present invention is illustrated in FIG. 1. A vacuum chamber 40 contains a filament 50 and a sample holder 70. The filament 50 is electrically connected to a filament power supply 10 which provides electrical bias across the filament. The sample holder 70 is electrically connected to sample bias power supply 20 which maintains the sample holder at a chosen bias with respect to the filament 50. The vacuum chamber 40 is connected to a vacuum pump 30. The vacuum pump 30 pumps gaseous compounds out of the vacuum chamber 40 to maintain the pressure inside the vacuum chamber 40 at a chosen level, preferably below $10^{-3}$ Torr. The sample holder 70 supports a sample 60 which is to be exposed to electron radiation. The sample 60 is located between the filament 50 and the sample holder 70, and electrically contacts the sample holder 70. This invention is applicable to an apparatus in which there are several filaments and holders with multiple samples located between a filament 50 and the bias potential established by a sample holder 70.

The sample 60 is a magnetic storage disk comprising a substrate of aluminum-magnesium (AlMg) alloy having a nickel-phosphorous (NiP) coating. The NiP is coated with a magnetic film of cobalt base metal alloy or a gamma phase iron oxide film. The magnetic film is then covered with an amorphous carbon or hydrogenated carbon film which acts as a protective overcoat. A magnetic disk with such a carbon based protective overcoat is illustrated in U.S. Pat. No. 4,778,582 to Howard.

The process of the present invention begins by coating the surface of the sample 60, which has the carbon based protective layer, with a lubricant. The lubricant can be coated on both sides of the disk because storage disks frequently have protective layers on both sides of the disk and use both sides of the disk for data storage. The lubricant is applied by spin coating the disk with the lubricant. The lubricant can also be applied by dipping the disk in a container of lubricant, evaporating the lubricant on the disk, or wiping the lubricant onto the disk. The initial thickness of the lubricant film when it is applied is approximately 30 angstroms.

The thickness value of the as applied lubricant is a function of two considerations. First, the lubricant bonding process removes some of the film, so that the end process thickness is not as large as the starting process thickness. Second, the thickness required at the end of the process on the magnetic disk depends on the static friction (friction between the read/write head and the disk when the head rests in one place on the disk) and the wear on the disk surface from the read/write head that the disk drive system can accommodate. This static friction value and wear consideration will be different for various drives, and as a result, the necessary thickness of the bonded lubricant will be different for various drive systems. The thickness of the bonded lubricant in this invention is in the range of 5 to 300 angstroms. The as applied thickness of the lubricant is, therefore, approximately in the range of 10 to 400 angstroms.

The lubricant bonded in the preferred embodiment of this invention is a perfluoropolyether (PFPE) such as Fomblin Z or Y made by Montedison. Krytox made by Dupont, or Demnum made by Daikin are also suitable lubricants for this process. Hydrocarbon lubricants are also effective, and can be bonded using this invention. The invention is not limited to PFPEs or hydrocarbons, as lubricants containing carbon, hydrogen, and oxygen (called aliphatic fatty acids) are also bonded using this invention. In addition, the bonding process is effective on non-lubricant hydrocarbons such as polyethylene glycol. The lubricants used in this embodiment of the invention are not limited to lubricants which contain reactive end groups. This means that the lubricant polymer is not required to have an OH— group on the end of the polymer, as required in thermal bonding processes. Even though the lubricant is not required to have a reactive end group, a lubricant which does have a reactive end group is still bondable by the process of the invention. The chemical structure of the lubricants referenced above are shown in FIG. 5.

Figure 2:
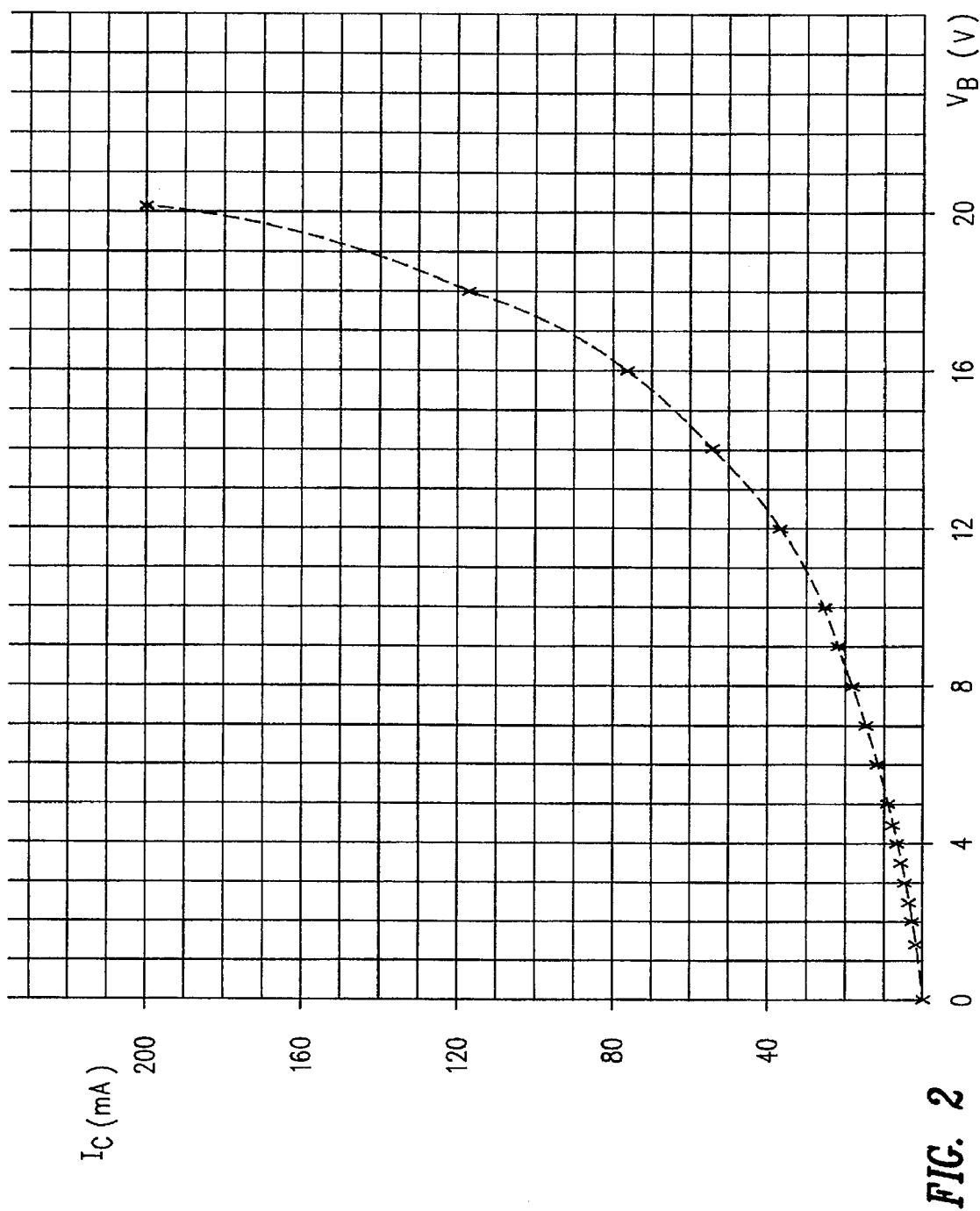
FIG. 2 illustrates a typical relationship between the supply holder current and the supply bias for the apparatus of FIG. 1.

The lubricant coated sample 60 is placed in the vacuum chamber 40 and supported by sample holder 70. The vacuum chamber 40 is evacuated to below $10^{-3}$ Torr by the vacuum pump 30. The filament supply 10 provides current to the filament 50. The filament is made of a material such as tungsten and has a typical resistance of approximately one ohm. The current running through the filament 50 produces electrons which are ejected from the filament into the vacuum chamber. The electrons are then attracted to the sample holder 70 which is at a higher bias than the low potential of the filament supply 10. The continuous discharge of electrons from the filament 50 and the resulting acceleration of electrons to the sample holder 70, forms an electron beam to which the sample is exposed. FIG. 2 illustrates the exponential relationship between the current Ic received by the sample 60 from the filament 50 and the applied sample bias 20 voltage, Vb. The voltage Vb directly affects the dosage, and therefore, the required exposure time of the sample to the electron beam for a defined exposure of electrons.

Figure 3:
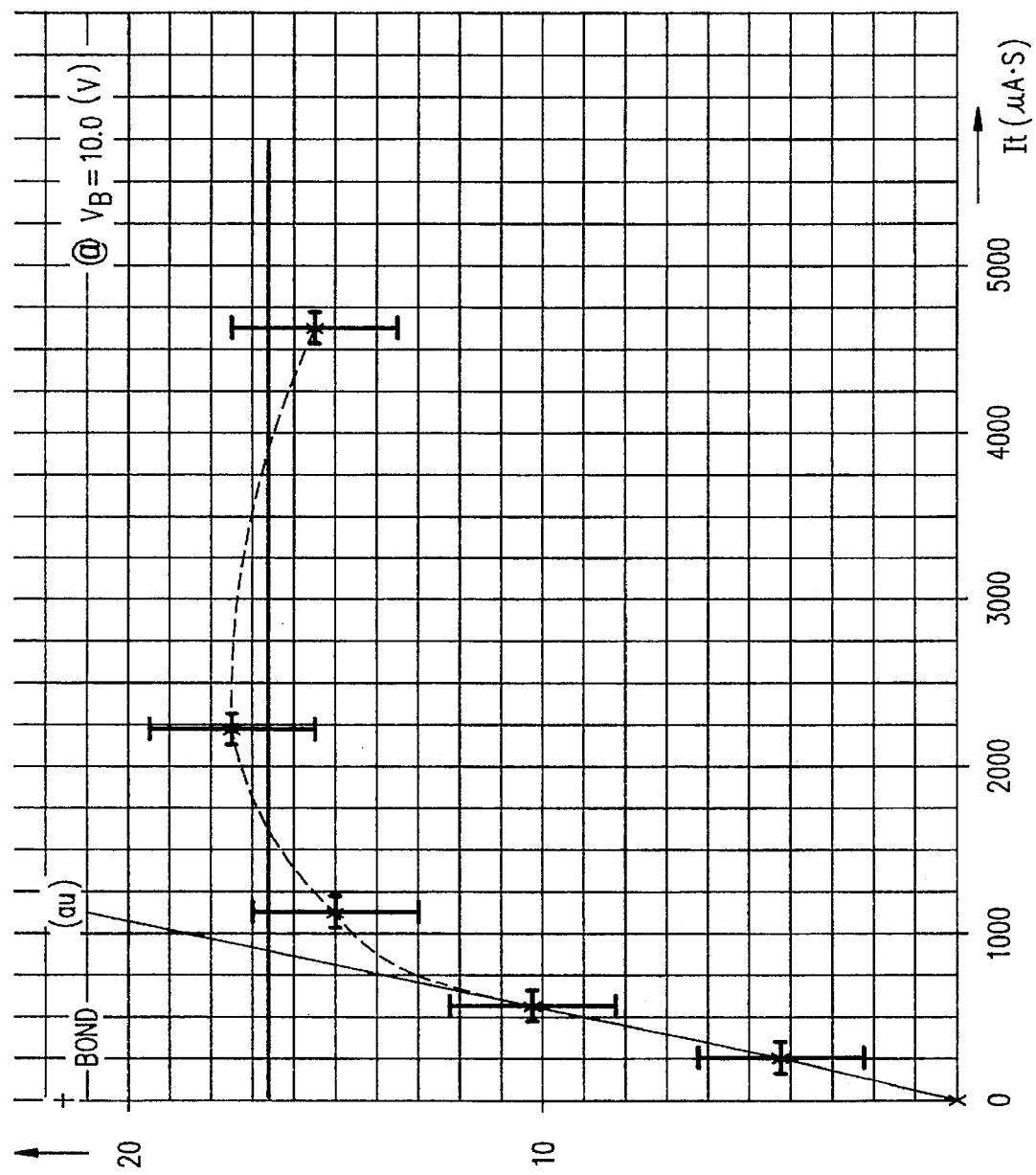
FIG. 3 illustrates the relationship between the bonded lubricant thickness and the charge level to which the lubricant is exposed in the present invention.

FIG. 3 illustrates the relationship between the thickness of the bonded lubricant $t_{bond}$ and the electron dose $I_t$ to which the sample is exposed, when the sample bias voltage Vb is maintained at 10 V. The as applied thickness of the lubricant characterized in FIG. 3 is approximately 30 angstroms. When the sample is exposed to a low dosage of electrons, below approximately 500 microcoulombs per square centimeter, the thickness of the bonded lubricant is less than 10 angstroms When the dosage is raised to approximately 1000 microcoulombs per square centimeter, approximately 15 angstroms of the lubricant is bonded to the disk surface. As the exposure of the sample to the electron dose increases, no further significant bonding of the lubricant to the disk surface occurs. The lubricant is fully bonded (a thickness of approximately 15 angstroms of bonded lubricant is obtained) when the surface of the lubricant is exposed to approximately $1.5 \times 10^{14}$ electrons per square centimeter of disk surface area.

Figure 4:
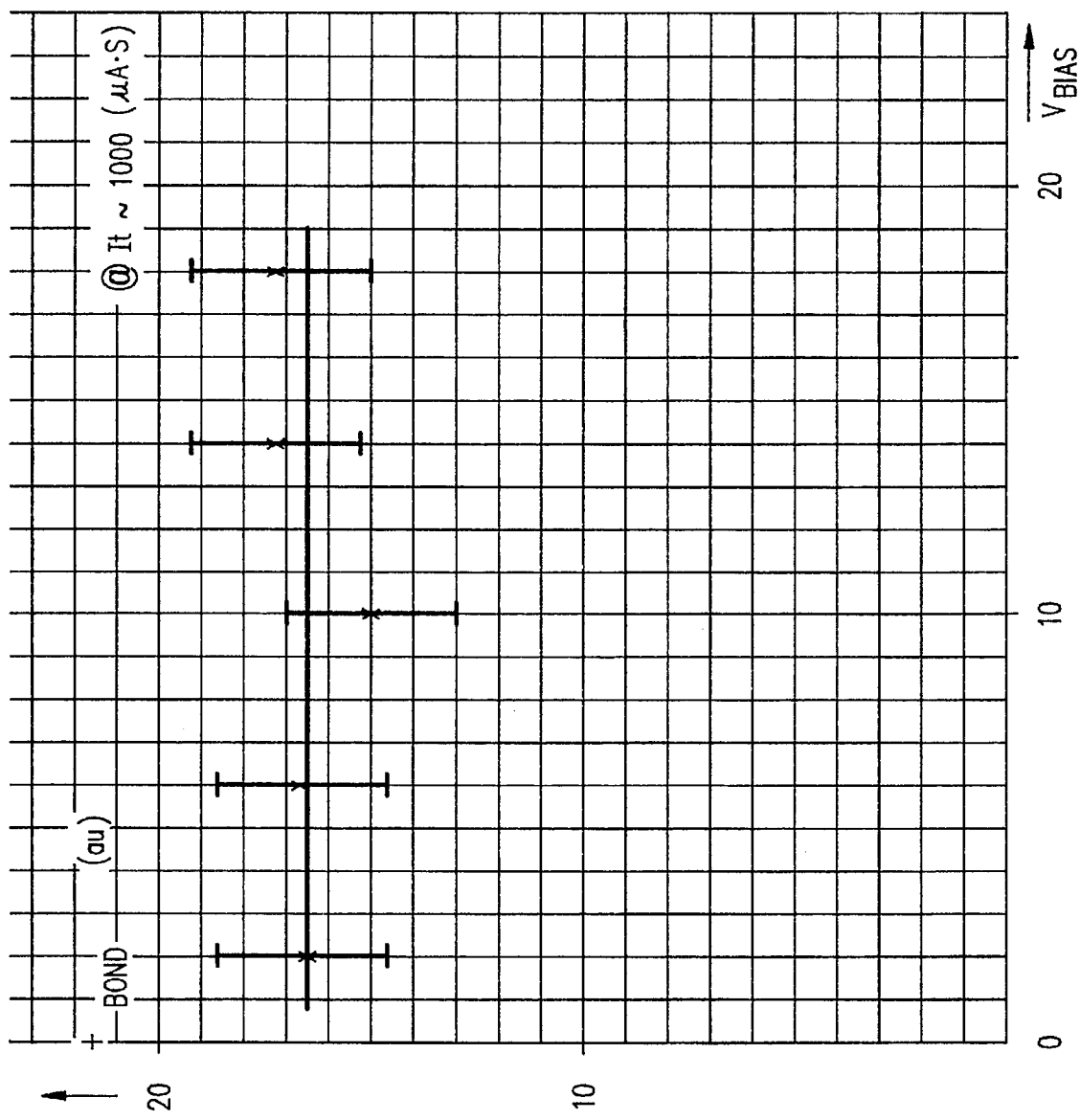
FIG. 4 illustrates the relationship between the bonded lubricant thickness and the supply holder bias.

FIG. 4 illustrates that the variation in sample bias voltage does not substantially affect the thickness of the bonded lubricant over the range of 2 to 20 volts. The sample bias primarily determines the time required to expose the sample to a predetermined number of electrons (or equivalently, a charge level). The thickness of the bonded lubricant is varied by changing the initial thickness of the lubricant applied. When approximately 300 angstroms of lubricant is applied, approximately 150 angstroms of lubricant is bonded to the disk surface. The thickness of the bonded lubricant varies, as in FIG. 3, with the charge level to which the surface is exposed. Again, approximately $1.5 \times 10^{14}$ electrons per square centimeter fully bonds the 150 angstroms. When the dosage level is substantially lower than this, less of the lubricant film is bonded to the disk surface. The primary factor affecting the bonded lubricant thickness is the initial lubricant thickness.

The electron exposure conditions illustrated in FIGS. 2–4 are specifically applicable for the Demnum lubricant. The exposure conditions for other perfluoropolyethers will be similar but not necessarily identical. Similarly, the suitable voltage and current range of the electrons, for bonding hydrocarbon lubricants, will be different than the fluorocarbon values given here. However, bonding any particular lubricant can be easily optimized by adjusting the energy level and exposure of the electron beam.

After the sample has been exposed to a proper dosage for an expected bonded lubricant thickness, in this case a dosage of approximately 1000 microcoulombs per square centimeter (which is approximately $1.5 \times 10^{14}$ electrons per square centimeter) for a bonded lubricant thickness of approximately 15 angstroms, the sample is removed from the vacuum chamber and the excess applied lubricant is removed. The excess lubricant is removed by rinsing the lubricated disk in liquid freon or other suitable rinse such as FC-72. FC-72 is a product manufactured by the Minnesota Mining and Manufacturing (3M) Company. The sample retains the bonded lubricant thickness through this rinsing process. The removal step is optional because it is not always necessary to remove the unbonded lubricant. If unbonded lubricant is desired as an overcoat to the bonded lubricant, it can be left on the disk after electron beam exposure. Alternatively, the unbonded lubricant can be removed and unbonded lubricant re-applied to the disk surface.

While this invention has been particularly described and illustrated with reference to several preferred embodiments thereof, it will be understood by those skilled in the art that changes in the above description or illustrations may be made with respect to form or detail without departing from the spirit and scope of the invention.

What is claimed is:

1. A magnetic recording media, comprising:

a substrate;

a magnetic film formed over said substrate;

a protective film formed over said magnetic film; and a layer of lubricant bonded to said protective film by exposure to an electron beam having an energy of less than approximately 100 electron volts, said bonded lubricant being selected from a group consisting of hydrocarbons, fluorocarbons, and aliphatic fatty acids, and said bonded lubricant having a thickness of approximately 5 to 300 angstroms.

2. The magnetic recording media as in claim 1, wherein said protective film is chosen from the group consisting of an amorphous carbon film and a hydrogenated carbon film.

3. The magnetic recording media as in claim 1, wherein said lubricant is chosen from the group consisting of:

$CF_3O$—$(CF_2CF_2O)n$-$(CF_2O)m$-$CF_3$, $HOCH_2CF_2O$—$(CF_2CF_2O)n$-$(CF_2O)m$—$CF_2CH_2OH$, Piperonyl-$OCH_2CF_2O$—$(CF_2CF_2O)n$-$(CF_2O)m$—$CF_2CH_2O$-piperonyl, $OCN$—$C_6H_3(CH_3)$—$NHCO$—$CF_2O$—$(CF_2CF_2O)n$-$(CF_2O)m$—$CF_2$—$CONH$—$C_6H_3(CH_3)$—$NCO$, $F(CF_2CF_2CF_2O)n$—$CF_2CF_3$, $F(CFCF_2O)n$—$(CF_2O)m$—$CF_2CF_3$ and $F(CFCF_2O)n$—$CF_2CF_3$.
    |                              |
    $CF_3$                         $CF_3$ 4. A method of bonding a lubricant onto a recording medium having a protective overcoat, comprising the steps of:

applying said lubricant to said protective overcoat, wherein said lubricant is a material selected from a group consisting of hydrocarbons, fluorocarbons, and aliphatic fatty acids; and exposing said lubricant to an electron beam having an energy of less than approximately 100 electron volts, so as to supply the requisite energy to bond approximately 5 to 300 Angstroms of said lubricant onto said protective overcoat.

5. The method according to claim 4, further comprising the steps of:

removing unbonded lubricant from said protective overcoat after exposure to said electron beam.

6. The method according to claim 4, wherein:

said lubricant is chosen from the group consisting of $CF_3O$—$(CF_2CF_2O)n$-$(CF_2O)m$—$CF_3$, $HOCH_2CF_2O$—$(CF_2CF_2O)n$-$(CF_2O)m$—$CF_2CH_2OH$, Piperonyl-$OCH_2CF_2O$—$(CF_2CF_2O)n$—$(CF_2O)m$—$CF_2CH_2O$-piperonyl, $OCN$—$C_6H_3(CH_3)$—$NHCO$—$CF_2O$—$(CF_2CF_2O)n$-$(CF_2O)m$—$CF_2$—$CONH$—$C_6H_3(CH_3)$—$NCO$, $F(CF_2CF_2CF_2O)n$—$CF_2CF_3$, $F(CFCF_2O)n$—$(CF_2O)m$—$CF_2CF_3$ and $F(CFCF_2O)n$—$CF_2CF_3$;
    |                              |
    $CF_3$                         $CF_3$ and said protective overcoat is chosen from the group consisting of an essentially amorphous carbon film or an essentially amorphous hydrogenated carbon film.

* * * * *